United States Patent

[11] 3,527,128

| [72] | Inventor | Carl Thumim<br>Chicago, Illinois |
|---|---|---|
| [21] | Appl. No. | 746,508 |
| [22] | Filed | July 22, 1968 |
| [45] | Patented | Sept. 8, 1970 |
| [73] | Assignee | Miehle-Goss-Dexter, Incorporated<br>Chicago, Illinois<br>a corporation of Delaware |

[54] MAGNETIC TAPE REVERSING SYSTEM
10 Claims, 3 Drawing Figs.

[52] U.S. Cl. .................................................. 83/71,
83/278, 214/1.6
[51] Int. Cl. ............................................. B26d 5/36,
G05b 19/16
[50] Field of Search ................................... 83/71, 278;
214/1.6

[56] References Cited
UNITED STATES PATENTS
3,118,334  1/1964  Blaha .......................... 83/71
3,183,749  5/1965  Haywood et al. .............. 83/71
3,236,131  2/1966  Barley .......................... 83/71

FOREIGN PATENTS
1,145,580  3/1963  Germany ....................... 83/71

Primary Examiner—William S. Lawson
Attorney—Ostrolenk, Faber, Gerb and Soffen

ABSTRACT: A magnetic tape control system for automatically reversing the direction of travel of the back gauge of a paper cutter in response to such back gauge reaching either the forwardmost or rearwardmost predetermined limit of travel. To eliminate the need for two direction-controlling tape channels for each channel which bears a cutting program, while at the same time prevents the possibility of the back gauge becoming "trapped" between the end of the work table and the nearest limit mark; the system utilizes distinguishable magnetic marks at each end of the tape to uniquely set the new direction of travel.

Patented Sept. 8, 1970 3,527,128
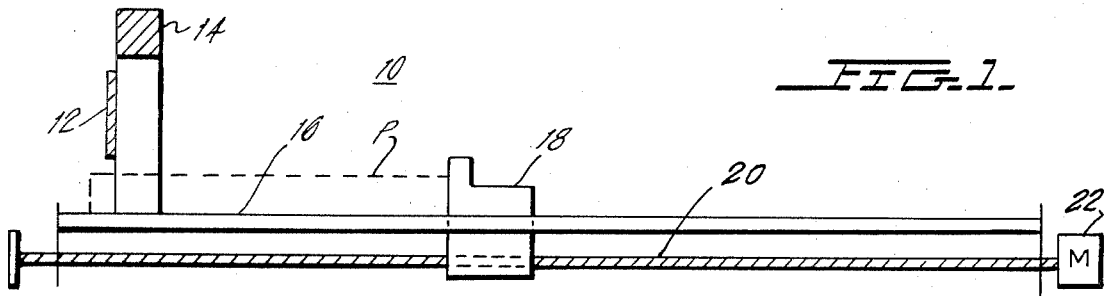
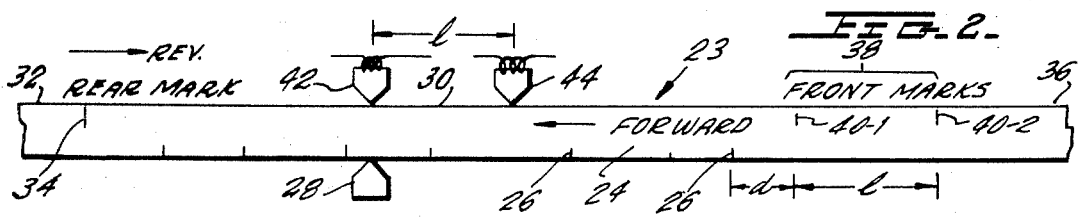
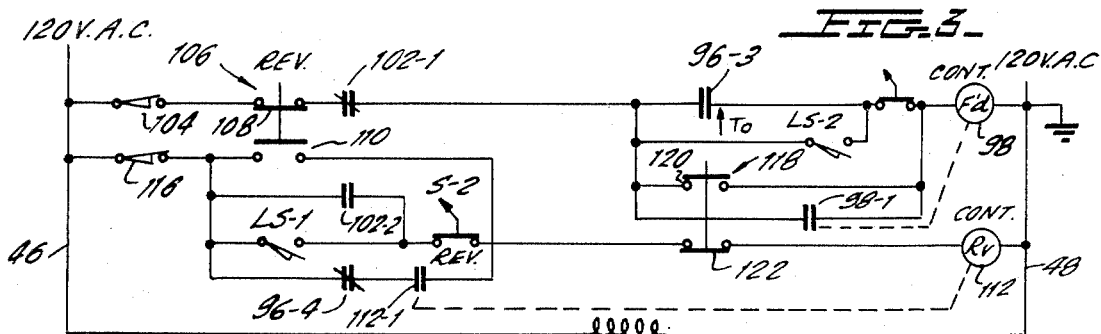
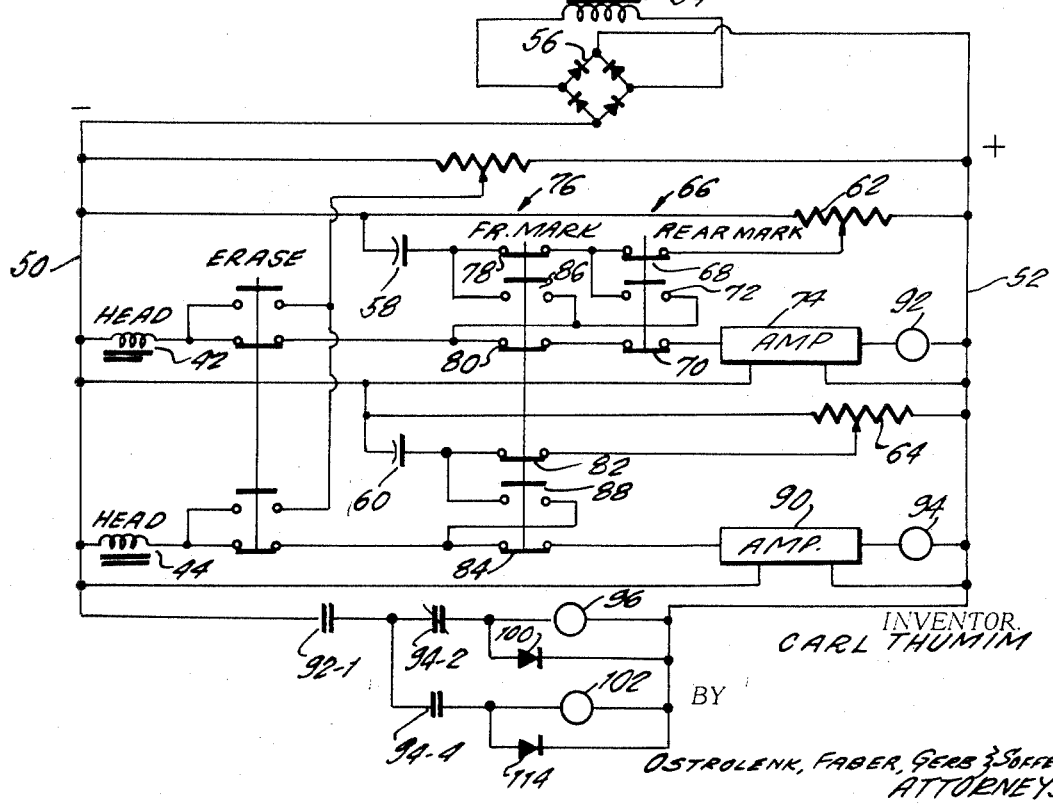
INVENTOR.
CARL THUMIM
BY
OSTROLENK, FABER, GERB & SOFFEN
ATTORNEYS

MAGNETIC TAPE REVERSING SYSTEM

This invention relates to paper cutters of the guillotine type and more particularly to a system for automatically reversing the direction of travel of the back gauge of such paper cutters, when the back gauge has reached its predetermined forwardmost or rearwardmost limit of travel.

Paper cutting machines of the guillotine type generally include a work table upon which a back gauge or spacer, as it is commonly called, is movable from the rear toward the blade to sequentially locate the material being cut beneath the blade in accordance with a desired cutting program. In recent machinery of this type, the cutting program, or a plurality of such programs, comprises a preselected sequence of signals recorded on channels of a magnetic control tape movable (relative to cooperating sensing heads) directly with or proportional to the movement of the back gauge. As the previously recorded signals of the cutting program are sensed by the magnetic pick-up heads, appropriate command signals are developed to slow down and stop the travel of the back gauge such that the paper to be cut is precisely located beneath the blade. After the cut, the back gauge resumes its travel until stopped once again by the detection of the next stop signal recorded on the job program. Customarily, indexing means are provided to shift laterally the sensing head relative to the tape so as to be responsive to a different channel thereof and a different cutting program recorded thereon.

An important aspect of tape control systems of the above described type is the means for reversing the direction of travel of the back gauge when it has reached either the forwardmost or rearwardmost preselected limits of travel. These limits are selected to cover the shortest span consistent with the cutting program to reduce back gauge travel, thus saving time and increasing productivity. In such direction-controlling systems, it is of course desirable to utilize signals recorded on the aforementioned magnetic control tape to define the limits of forward and reverse travel, but at the same time, the use of such direction-controlling signals cannot interfere with or become mistaken for stop or slow-down signals which are part of the cutting program.

Thus one prior art system for reversing the direction of travel of the back gauge utilizes two separate direction-controlling channels of the control tape for each channel of tape which bears a recorded cutting program. One of these channels carries at one end a recorded signal which, along with the magnetic head, locates one of the limits of travel, for example, the forwardmost limit of back gauge travel. The second of these direction-controlling channels bears at its opposite end a second recorded signal which locates the other of the limits of back gauge travel, for example, the rearwardmost limit of back gauge travel. In operation, when the back gauge has reached the forwardmost preselected limit of travel, the first described direction-controlling mark is sensed, through appropriate circuitry and generates a command signal which throws the back gauge into reverse travel. The back gauge thus moves toward the rear of the machine until the second direction-controlling mark is picked up which, in turn, generates a signal to reverse direction of travel of the back gauge toward the front of the machine. It is during the forward travel of the back gauge, between the preselected limits of travel, that the cutting program channel cooperates with associated heads to continually slow down, stop and restart the back gauge at each of the desired cutting locations.

The obvious disadvantage of the above described prior art system is the requirement of two channels of tape for direction-control for one channel which bears a cutting program. This either limits the number of channels that can be used for cutting programs on a given width of tape or conversely calls for a wider tape for a definite number of cutting programs.

Other prior art systems for reversing direction of the back gauge have attempted to eliminate the use of two direction-controlling channels for each cutting program channel by utilizing a single direction-controlling channel having the front and rear limit control signals recorded on opposite ends thereof. Ideally, these two signals will define the limits of travel such that the back gauge will reciprocate in a path of travel defined by these marks. However, it will be appreciated that in many situations, either intentionally or by virtue of some misoperation in the machine, it is possible that the back gauge will be brought forward of its preselected forwardmost position, or, alternatively, located to the rear of the preselected rearwardmost position. With a system employing but a single channel and a single pick-up head to reverse the direction of travel whenever one of the limit marks is detected, in the situation just described, the back gauge will become trapped between one end of the table (actually a fail-safe mechanical limit switch) and the nearest of the preselected (forwardmost or rearwardmost) limits of travel. What actually occurs in the tape control system is that when the back gauge has been intentionally or unintentionally moved forward of the preselected forwardmost position, the direction-controlling head of the system is moved in front of the magnetic mark which defines this forwardmost back gauge position. However, when the back gauge is reversing, and the direction-controlling head senses the forwardmost signal, the head cannot differentiate this signal from the rearwardmost signal located at the far end of the tape and hence throws the back gauge into forward travel despite the fact that the back gauge should be permitted to travel to the rear of the work table. A similar trapping situation occurs when the back gauge, either intentionally or unintentionally, begins its forward travel from a point to the rear of the normal preselected limit of travel. Trapping itself would not be too harmful except that automatic indexing to other channels takes place at reversal of back gauge travel, usually from forward to reverse. The program could then be in the wrong channel without being noticed by operator with costly consequences.

Another prior art system, disclosed in U.S. Pat. No. 3,183,749, apparently appreciated this problem of back gauge trapping and further appreciated that this situation would arise every time the back gauge, because of its high momentum, overtravelled either the forward or rearwardmost preselected limits of travel. Accordingly a time delay system is provided which prevents the direction reversing system from operating until the back gauge has had sufficient time to at least retraverse the normal overtravel which it experiences when being brought to a stop. However, it will be appreciated that although this system does compensate for normal overtravel of the back gauge during the stopping operation, it would not prevent trapping of the back gauge in a situation where the back gauge were moved beyond the front mark or rear mark by a distance greater than the normal inertial distance.

In contrast thereto, the instant invention provides a system for automatically reversing the direction of travel of the back gauge of a paper cutting machine which completely eliminates the possibility of the back gauge becoming trapped between the end of the work table of the machine and the nearest preselected limit of intended travel for the back gauge. Furthermore, and as will be described in greater detail, by utilizing different signals to indicate forwardmost and rearwardmost positions of back gauge travel, it is possible to prevent trapping in all situations while at the same time require only a single direction-controlling channel of tape for each channel which bears a cutting program.

Thus in a preferred embodiment of the instant invention, the basic concept of using different signals for front and rear limits of back gauge travel is implemented by using a single recorded signal at one end of a direction-controlling channel of the tape, say, for example, to serve as the rearwardmost limit of back gauge travel; and recording a pair of spaced apart signals at the opposite end of the direction-controlling channel to serve, for example, as the forwardmost limit of back gauge travel. Cooperating with the direction-controlling channel is a pair of magnetic heads spaced apart by the same distance as the aforementioned pair of marks.

In operation, as the back gauge reaches its forwardmost limit of travel, both signals at the one end of the tape are detected by the pair of direction-controlling magnetic heads whereby appropriate signals are developed to reverse the direction of travel of the back gauge toward the rear. As the back gauge reaches the rear of its travel, the single recorded mark at the other end of the tape is sensed by one of the pair of magnetic direction-controlling heads which, through appropriate circuitry, generates a signal to reverse the direction of travel of the back gauge and start it toward the front of the machine once again. Thus by having different signals defining the forwardmost and rearwardmost positions of back gauge travel, the control system for reversing the direction of travel of the back gauge, can differentiate between the front and rearwardmost positions and prevent trapping while still requiring only a single channel of tape.

As a particularly advantageous feature of the instant invention, it has been appreciated that despite the fact that the instant invention avoids trapping of the back gauge in most situations, there is one possibility in which the trapping situation might arise. Thus, assume that two recorded signals on the direction-controlling channel have been utilized to define the forwardmost limit of back gauge travel. If, either intentionally or unintentionally, the back gauge should be moved forward of its preselected forwardmost position, the two front marks on the direction-controlling channel will be brought in front of the two magnetic heads of the direction-reversing system. When the back gauge begins its reverse direction, the second of the two marks defining the forwardmost position will be detected by the first head of the pair of heads cooperating with the direction-controlling channel.

Normally, the detection by one head of one direction-controlling mark would indicate that the back gauge has reached its rearwardmost position and would initiate reversal of direction toward the forward end of the cutting table. Thus trapping would occur. However, in accordance with the instant invention, means are provided to introduce a predetermined time delay after a single head detects a single mark before the back gauge is reversed toward the front of the machine. This time delay is sufficiently large such that if in fact the back gauge had been in front of its forwardmost position, the magnetic heads will have a chance to detect the presence of both of the pair of signals recorded on the one end of the direction-controlling tape and generate appropriate signals which in effect tells the control system to disregard the initial detection of the single mark by the single head and allow the back gauge to continue travelling in the rearward direction. Finally, when the single mark which defines the correct rearward location is detected by the first head of the pair of magnetic direction-controlling heads, the control circuitry (after a similar delay in which no second signal is detected) will generate signals to reverse the direction of the back gauge travel.

Accordingly, it is an object of the instant invention to provide a system for automatically reversing the direction of travel of the back gauge of a paper cutting machine which prevents trapping of the back gauge between the end of the work table of the machine and the nearest of the preselected limits of travel of the back gauge.

Another object of the instant invention is to provide such a system for automatically reversing the direction of travel of the back gauge of a paper cutting machine which requires only a single direction-controlling channel of control tape for each channel which bears a cutting program.

Still another object of the instant invention is to provide such a system for reversing the direction of travel of the back gauge of a paper cutting machine which utilizes distinguishable marks at each end of the direction-controlling channel of a magnetic control tape in order to uniquely determine the forwardmost and rearwardmost limits of travel of the back gauge thereof.

Yet another object of the instant invention is to provide such a system for reversing the direction of travel of the back gauge of a paper cutting machine which utilizes a single recorded signal to indicate one limit of back gauge travel and a pair of spaced apart signals recorded at a second end of a channel control tape for indicating a second limit of back gauge travel.

Still another object of the instant invention is to provide such a system for reversing the direction of travel of the back gauge of a paper cutting machine which utilizes a pair of direction-controlling magnetic sensing heads spaced apart by the same distance as the aforementioned pair of signals defining the second limit of travel.

Another object of the instant invention is to provide such a system for automatically reversing the direction of travel of the back gauge of a paper cutting machine which includes means for inhibiting the automatic reversal system by a period of time which allows the aforementioned direction-controlling magnetic sensing heads to detect the full presence of a multimark direction-controlling signal in the event that one of such magnetic heads initially detects only the first of a plurality of such marks.

Other objects and a fuller understanding of the instant invention may be had by referring to the following description and drawings, in which:

FIG. 1 illustrates a guillotine paper cutter of the type with which the instant invention is intended to cooperate;

FIG. 2 illustrates a portion of a control tape utilized to control the movement of the back gauge illustrated in FIG. 1, and further illustrates part of the novel automatic reversing system of the instant invention; and FIG. 3 is a schematic circuit diagram of the instant invention.

Turning to FIG. 1, there is schematically illustrated a paper cutting machine 10, of the guillotine type, so named because of the blade 12 reciprocally carried within a frame 14 above a work table 16. Although not shown in FIG. 1, the work table 16 generally includes an elongated central slot up through which a back gauge or spacer 18 projects. Customarily, the lower portion of the back gauge 18 threadably engages a lead screw 20 which is rotatable by means of a motor 22. Rotation of the lead screw 20 in a first direction causes the back gauge 18 to move forward and locate continually a stack of material to be cut, P, beneath the blade 12 in accordance with a desired cutting program. When the back gauge reaches a forwardmost limit of travel the motor is reversed to rotate the lead screw 20 in the opposite direction which, in turn, causes the back gauge 18 to travel to the rear of the machine to await the insertion of a new stack of material P.

Turning to FIG. 2, there is illustrated a magnetic control tape 23 for the paper cutter of FIG. 1. As well known in the art, the tape includes one or more channels such as 24 which carries a cutting program comprising a plurality of previously recorded magnetic marks 26, which are sequentially sensed by a cooperating magnetic pick-up head 28 as the tape 23 moves relative to the head 28. In the majority of cutting machines, the tape 23 is movable past the pick-up head 28 in response to movement of the back gauge 18. The movement of the tape may by in a 1 to 1 relationship with respect to the gauge 18, or its movement may be proportional to the movement of the back gauge. In still other machines, the tape such as 23 remains stationary while the pick-up head 28 travels along the tape in response to movement of the back gauge.

In either of the systems described above, operation is the same. The cutting program is recorded on the channel 24 of the tape with the location of the marks 26 defining the cutting program. The material P is inserted in the front of the machine 10 against the back gauge 18 and the back gauge is started in a forward direction which simultaneously begins the relative movement of the pick-up head 28 and the marks 26. When the first mark 26 is detected by the head 28, appropriate circuitry (not shown) is energized to generate a command signal which deenergizes the motor 22 (or disconnects, via a clutch, the motor 22 from the lead screw 20) such that the back gauge 18 is brought to a halt. The cut is made, and the back gauge begins its forward travel once again until the head 28 detects the next signal 26 of the cutting program.

FIG. 2 also illustrates the automatic reversing system of the instant invention. Specifically, a direction-controlling channel 30 is provided on the tape 23 which carries at one end 32 thereof a first direction-controlling signal 34 and at the other end 36 thereof a second direction-controlling signal 38 is different (distinguishable) from the first direction-controlling signal mark 34. Thus in a preferred embodiment, the first direction-controlling signal (identified as a rear mark) is a single previously recorded magnetic mark whereas the second direction-controlling signal 38 (identified as the front mark) comprises a pair of spaced apart previously recorded magnetic marks 40—1 and 40—2. A pair of direction-controlling magnetic heads 42 and 44 cooperate with the direction-controlling channel 30 and are spaced apart by a distance "l" which corresponds to the distance between the pair of magnetic marks 40—1 and 40—2 defining the second direction-controlling signal.

In operation, the back gauge 18 continues to travel toward the front of the machine 10 under the stop and start directions generated by the cooperation of the cutting program marks 26 and the head 28. When the last cut in the program has been made, as defined by the last mark 26', the back gauge travels forward by a distance corresponding to the distance "d" between the mark 26' and the first mark 40—1 of the front marks 38 (such that the operator doesn't have to place his hands beneath the cutting blade 12 in order to withdraw the last stack of material P). Finally, the front marks 40—1 and 40—2, which define the forwardmost preselected limits of travel of the back gauge 18, are detected by the heads 42 and 44 and, by means to be further described, cause the motor 22 to be reversed to begin the travel of the back gauge 18 toward the rear of the machine.

The back gauge 18 continues travelling in the rear direction until the mark 34 which defines the rearwardmost limit of back gauge travel, is detected by the head 42 to generate appropriate command signals, in a manner to be further described, to once again reverse the motor 22 and cause back gauge 18 to travel once again toward the front of the machine whereby the head 28 may detect either the same cutting program recorded on the channel 24, or, if the head 28 has been moved laterally with respect to the tape 23, it may detect a different cutting program recorded on another channel of the tape 23.

Turning to FIG. 3, there is illustrated the preferred circuitry for carrying out the above described operation. Basic control voltage is supplied by 120 volts AC power lines 46 and 48 which also supply DC power lines 50 and 52 via the transformer 54 and a full wave rectifier 56.

Under normal static conditions, capacitors 58 and 60 are charged up to required voltages according to the adjustments on resistors 62 and 64, respectively, interposed between the DC buses 50 and 52. When the operator has the back gauge 18 in a preselected rear position, and wishes to mark it on the tape channel 30, he presses the rear mark pushbutton switch 66 which opens normally closed contacts 68 and normally closed contact 70 and closes normally open contact 72. The opening of contact 68 disconnects the source of voltage (resistor 62) from the capacitor 58. Opening of contact 70 disconnects an amplifier 74 from the direction-controlling head 42; while the closing of normally open contact 72 connects capacitor 58 to discharge through the head 42 and to place a magnetic mark (34 of FIG. 2) on the direction-controlling channel 30.

When the operator has the back gauge 18 in its forwardmost preselected limit of travel, and wishes to mark it on the tape channel 30, he presses the front mark pushbutton switch 76 which opens the contacts 78, 80, 82 and 84 and closes the contacts 86 and 88. The opening of contacts 78 and 82 disconnects the voltage sources, namely resistors 62 and 64, from the capacitors 58 and 60. The opening of contacts 80 and 84 disconnects the amplifiers 74 and 90 from the direction-controlling heads 42 and 44; while the closing of the contacts 86 and 88 connects the charged capacitors 58 and 60 to discharge through the heads 42 and 44, respectively, and thereby have each head place a magnetic mark (40—1 and 40—2 of FIG. 2) on the tape channel 30, which mark will define the forwardmost limits of back gauge travel.

In operation, as the back gauge 18 is travelling to the rear, the rear mark 34 will pass under the pick-up head 42. The voltage induced in the head 42 is amplified by the amplifier 74 (see FIG. 3) to pick up a relay coil 92, the normally open contacts 92—1 of which are closed to establish a circuit through the normally closed contacts 94—2 of a coil 94 and a relay coil 96.

The relay 96 is a time delay relay of suitable design which introduces a delay, the purpose of which will be further explained, between its energization (at the closing of the contact 92—1) and the time that the normally open contact 96—3 thereof closes and normally closed contact 96—4 thereof opens.

After the aforementioned delay, the normally closed contact 96—4 opens to interrupt a reverse motor contactor 112 and the normally open contact 96—3 closes to establish an electrical path through a forward contactor 98 which, when energized, reverses the direction of the motor 22 to cause the back gauge to begin its forward travel. The forward contactor 98 includes a normally open contact 98—1 which is closed in response to energization of the contactor 98 to establish a lock-in circuit for the forward contactor 98 to keep the contactor 98 energized when the relay coil 96 is deenergized such that its contact 96—3 re-opens. Relay coil 96 includes reverse bias diode 100 in parallel therewith which gives the back EMF of the relay coil 96 a path for discharge after the contact 92—1 has been opened and thereby allows the coil 96 to remain energized (and its contact 96—3 closed) for a period of time which allows the lock-in contact 98—1 to close.

The back gauge 18 continues travelling in the forward direction until the forward contactor 98 is interrupted either by the normally closed contacts 102—1 of a relay coil 102 (which, as will be explained immediately below, is associated with the detection of the forward mark 40—1 and 40—2) or, by the opening of a front limit switch 104 which is in reality a fail-safe mechanical limit switch which stops the forward motion of the back gauge 18 in the event that the automatic reversing system of the instant invention fails. If desired, a reverse pushbutton 106 can be provided to manually reverse the back gauge 18 by means of a normally closed contact 108 which interrupts the current flow through its forward contactor 98 and by virtue of the normally open contact 110 the closing of which establishes a current path through the reverse contactor 112 which reverses the motor 22 to throw the back gauge into reverse travel.

Assuming that the back gauge 18 is travelling in a forward direction, the marks 40—1 and 40—2 defining the forward limit of back gauge travel, are sensed by the heads 42 and 44. The voltages induced in these heads are amplified by amplifiers 74 and 90, respectively, and pick up the coils 92 and 94 which closes the contacts 92—1, opens the normally closed contacts 94—2 and closes the normally open contacts 94—4, the end result of which is to energize only the relay coil 102 which, as noted previously, opens the normally closed contacts 102—1 to interrupt current flow through the forward contactor 98 and closes normally open contact 102—2 to establish a current path through reverse contactor 112 which throws the motor 22 into reverse gear which starts the back gauge 18 moving to the rear of the machine 10. The reverse contactor 112 includes a lock-in contact 112—1 which maintains the reverse contactor 112 energized (through the normally closed contacts 96—4 of relay 96) when the relay 102 drops out and contact 102—2 returns to its normally open condition. As was the case for relay 96, relay 102 includes a reverse biased diode 114 which permits a relatively slow discharge of the back EMF induced in the coil 102.

Reverse travel of the back gauge 18 would continue until, as described earlier, the mark 34 was sensed by the head 42 or, if the system failed, until the back gauge 18 physically engaged and opened a rear limit switch 116. Additionally, if desired, a forward pushbutton 118 can be provided to allow the operator to manually switch from reverse to forward direction of back gauge travel. The forward pushbutton 118 includes a normally open contact 120 and a normally closed contact 122. Depression of the pushbutton 118 opens the normally closed contact 122 to interrupt the current flow to reverse contactor 112 while at the same time the closing of the normally open contact 120 establishes a current path through the forward contactor 98.

Thus it will be appreciated that by the provision of separately distinguishable marks at the forwardmost and rearwardmost limits of travel, the system of the instant invention requires only a single channel of control tape while at the same time prevents the back gauge from becoming trapped between a mechanical limit switch and the nearest mark of the reversing system. However, there is one situation where trapping could occur if not compensated for by the instant invention. Specifically, if the back gauge were intentionally or unintentionally moved forward of its forwardmost preselected position such that the marks 40—1 and 40—2 of the control channel 30 were moved forward of the heads 42 and 44, then on reversal, the mark 40—2 would first be detected by the head 42. In the absence of precautionary means, one head 42 sensing one mark would mistakenly begin a reversal operation sending the back gauge forward toward the front of the machine.

Accordingly, as noted previously, whenever the head 42 senses the presence of a single mark and the relay 92 is energized which closes the contacts 92—1 to pick up the relay 96, there is a delay in the closing of the normally open contacts 96—3 thereof and a delay in the opening of the normally closed contacts 96—4 thereof. This delay is of sufficient time to allow the tape 23 to traverse a distance "1" such that if there were a second mark following the first, namely mark 40—1 following 40—2, both heads 42 and 44 will pick up signals such that both relay coils 92 and 94 are energized whereby relay coil 102 will be energized which will maintain contacts 102—1 open and 102—2 closed to keep the back gauge travelling toward the rear of the machine. Thus even trapping in this situation is prevented by the instant invention.

In the other possible trapping situation, that is, where the back gauge may have been accidentally moved to the rear of the rear limit mark, the mark 34 will be located to the right of the head 44 in FIG. 2. If now the back gauge begins to travel forward, the single mark 34 will have no influence when first detected by head 44 (since contacts 92—1 will never close). Similarly, when the single mark is detected by the head 42, the relay 92 will be energized and the contact 92—1 closed and consequently the relay 96 energized. However, by virtue of the forward contactor locking contact 98—1, the forward contactor has been energized all along, such that the closing of relay contacts 96—3 in response to energization of relay 96 will have no effect.

Finally, if automatic reversal is not desired, snap switches 124 and 126 may be provided, which, when actuated, nullify the effect of relays 96 and 102.

Thus there has been described an automatic system for reversing the direction of travel of the back gauge of a paper cutting machine whenever such back gauge reaches the forwardmost or rearwardmost limits of travel which has been previously recorded on a magnetic control tape associated therewith. By the use of distinguishable signals to indicate front limit and rear limit of travel, it is possible to utilize a single direction-controlling channel of tape while at the same time prevent accidental trapping of the back gauge between one of the limits of travel and the nearest end of the work table.

Although there has been described a preferred embodiment of the instant invention, other embodiments falling within the scope of the invention are possible. For instance, if desired, two magnetic marks can be utilized to indicate the rearwardmost limit of back gauge travel while a single mark can be utilized to indicate the forwardmost limit of back gauge travel. Thus the instant invention is to be limited only by the following claims.

I claim:

1. In a paper cutting machine having a back gauge which travels along a work table to position material beneath a knife in accordance with a cutting program recorded on a first channel of magnetic tape which moves relative to at least one magnetic sensing head in response to movement of said back gauge, and motor means for stopping and starting the travel of said back gauge in response to said cutting program being detected by said one magnetic sensing head; the improvement comprising a system for automatically reversing the direction of travel of said back gauge when it reaches a preselected forwardmost and rearwardmost position in its travel, said system including:

first and second spaced apart direction-controlling magnetic heads operatively positioned with respect to a second channel of said magnetic tape to detect direction-controlling signals recorded thereon;

a first direction-controlling signal recorded at a first end of said second channel;

second direction-controlling signals recorded at a second end of said second channel; and control means responsive to said first magnetic head detecting the presence of said first direction-controlling signal and to said first and second magnetic heads detecting the presence of said second direction-controlling signal for automatically reversing the direction of travel of said back gauge.

2. In the paper cutting machine of claim 1, wherein said second direction-controlling signals comprise a pair of recorded signals spaced apart by the same distance that said first and second direction-controlling magnetic heads are spaced apart.

3. In the paper cutting machine of claim 2, wherein said control means includes inhibiting means for preventing the reversal of travel of said back gauge for a period of time which allows relative movement between said direction-controlling magnetic heads and said tape for a distance at least equal to the distance between said pair of recorded signals; whereby said back gauge will not be reversed to the forward direction in the event it is reversing from a location in front of said preselected forwardmost position.

4. In the paper cutting machine of claim 1, wherein said motor means includes forward and reverse contactors which control the forward and reverse movement of said back gauge, and said control means includes first and second relay means which have respective contacts operated thereby for causing the energization of said reverse contactor when said first and second direction-controlling magnetic heads detect said second direction-controlling signals and for causing the energization of said forward contactor when said first direction-controlling magnetic head detects said first direction-controlling signal.

5. In the paper cutting machine of claim 4, said control means further including third and fourth relay means, said third relay means being energized in response to energization of said first relay means; said fourth relay means being energized in response to energization of said first and second relay means, said third relay means having normally open contacts in electrical series with said forward contactor and a power supply; said fourth relay means having normally open contacts in electrical series with said reverse contactor and said power supply; energization of said first relay means in response to the detection of said first direction-controlling signal causing the energization of said third relay means which closes the normally open contact thereof to electrically connect said power supply to said forward contactor which causes said motor means to bring about forward travel of said back gauge; energization of said first and second relay means in response to the detection of said second direction-controlling signals causing the energization of said fourth relay means which closes the normally open contact thereof to electrically connect said power supply to said reverse contactor which causes said motor means to bring about reverse travel of said back gauge.

6. In the paper cutting machine of claim 5, said first relay means having normally open contacts in electrical series with said third relay means and said power supply; said second relay means having normally closed contacts in electrical series with said third relay means and normally open contacts in electrical series with said fourth relay means, whereby the energization of said first relay means causes the energization of said third relay means, and the energization of said first and second relay means will energize only said fourth relay means.

7. In the paper cutting machine of claim 5, wherein said second direction-controlling signals comprise a pair of recorded signals spaced apart by the same distance that said first and second direction-controlling magnetic heads are spaced apart; wherein said control means includes inhibiting means for preventing the reversal of travel of said back gauge for a period of time which allows relative movement between said direction-controlling magnetic heads and said tape for a distance at least equal to the distance between said pair of recorded signals, whereby said back gauge will not be reversed to the forward direction in the event it is reversing from a location in front of said preselected forwardmost position; and wherein said inhibiting means includes time delay means associated with said third relay means for preventing the closing of the normally open contacts of said third relay means for said period of time; whereby in the event said back gauge is travelling in the reverse direction from a starting point forward of said preselected forwardmost position and one of said pair of recorded signals of said second direction-controlling signals is detected by said first direction-controlling magnetic head, said time delay means will prevent the closing of the normally open contacts of said third relay means and thereby prevent said forward contactor from being energized by said power supply for said period of time such that said first and second direction-controlling magnetic heads can detect the full presence of said pair of signals of said second direction-controlling signals and thereby energize said fourth contact to maintain said reverse contactor in electrical series with said power supply which thereby maintains the travel of said back gauge in the reverse direction.

8. In the paper cutting machine of claim 7, wherein said forward contactor includes lock-in contact means operated thereby for maintaining said forward contactor in series with said power supply when said third relay means is de-energized, and further including means for maintaining said third relay means energized for a period of time which allows said lock-in contact means to operate.

9. In the paper cutting machine of claim 8, wherein said reverse contactor includes lock-in contact means operated thereby for maintaining said reverse contactor in series with said power supply when said fourth relay means is de-energized, and further including means for maintaining said fourth relay means energized for a period of time which allows said lock-in contact means of said reverse contactor to operate.

10. In a paper cutting machine having a back gauge which travels along a work table to position material beneath a knife in accordance with a cutting program recorded on a first channel of magnetic tape which moves relative to at least one magnetic sensing head in response to movement of said back gauge, and motor means for stopping and starting the travel of said back gauge in response to said cutting program being detected by said one magnetic sensing head; the improvement comprising a system for automatically reversing the direction of travel of said back gauge when it reaches a preselected forwardmost and rearwardmost position in its travel, said system including:
  direction-controlling magnetic head means operatively positioned with respect to a second channel of said magnetic tape to detect direction-controlling signals recorded thereon;
  first direction-controlling signal means recorded at a first end of said second channel;
  second direction-controlling signal means, different from said first signal means, recorded at a second end of said second channel; and
  control means responsive to said direction-controlling magnetic head means detecting the presence of said first and second direction-controlling signal means for automatically reversing the direction of travel of said back gauge.